United States Patent [19]

Kaneuchi

[11] Patent Number: 4,853,925
[45] Date of Patent: Aug. 1, 1989

[54] INFORMATION MEMORY UNIT

[75] Inventor: Kazuo Kaneuchi, Kawasaki, Japan

[73] Assignee: Kabushiki Kaisha Toshiba, Kawasaki, Japan

[21] Appl. No.: 90,371

[22] Filed: Aug. 28, 1987

[30] Foreign Application Priority Data

Sep. 1, 1986 [JP] Japan .................................. 61-205309

[51] Int. Cl.4 ............................................. G11B 23/03
[52] U.S. Cl. .................................... 369/291; 206/312; 206/444; 360/133
[58] Field of Search ...................... 364/291, 292, 77.2; 360/133; 206/312, 444

[56] References Cited

U.S. PATENT DOCUMENTS

| | | | |
|---|---|---|---|
| 4,546,397 | 10/1985 | Asami et al. | 360/133 |
| 4,589,105 | 5/1986 | Nemoto et al. | 369/291 |
| 4,614,990 | 9/1986 | Saito | 360/133 |
| 4,680,662 | 7/1987 | Fukushima et al. | 369/291 |
| 4,682,322 | 7/1987 | Ohta | 369/291 |
| 4,685,017 | 8/1987 | Swinburne et al. | 360/133 |
| 4,688,206 | 8/1987 | Nakagawa et al. | 369/291 |

Primary Examiner—Steven L. Stephan
Attorney, Agent, or Firm—Finnegan, Henderson, Farabow, Garrett and Dunner

[57] ABSTRACT

An information memory unit includes a cartridge and an information memory medium rotatably arranged in the cartridge. The cartridge has a cartridge body having first and second surface walls facing each other. A shutter is slidably mounted on the cartridge body and includes a first shielding portion located on the first surface wall, for opening and closing a first opening portion formed in the first surface wall, a second shielding portion located on the second surface wall, for opening and closing a second opening portion formed in the second surface wall, and a coupling portion connecting the first and second shielding portions. The first and second shielding portions has guide projections which are engaged first and second guide grooves formed in the first and second surface walls, respectively. When the shutter is fitted to the cartridge body, the guide projections are guided to the first and second guide grooves, respectively, by means of first and second fitting grooves which are formed in the first and second surface walls, respectively.

19 Claims, 5 Drawing Sheets

FIG. 12

INFORMATION MEMORY UNIT

BACKGROUND OF THE INVENTION

The present invention relates to an information memory unit including an information memory medium and a cartridge containing the same.

Recently, optical disks, which are advantageous over magnetic disks, have been put to practical use as information memory media. Each optical disk is contained in a cartridge, which facilitates handling of the disk and protects it from mechanical damage and dust.

In general, the cartridge has an opening portion through which information is processed for the optical disk. A read/write head is brought close to the disk through the opening portion. The opening portion is opened and closed by means of a shutter which is slidably attached to the cartridge. Conventionally, the shutter is mounted on the cartridge by fitting a guide piece, formed by raising part of the shutter, into a guide groove on the cartridge.

In attaching the shutter to the cartridge, the shutter is first mounted on the cartridge, and the guide piece is then bent and fitted into the guide groove.

According to such a method of attachment, however, the guide piece must be bent, thus requiring additional troublesome work and lowering the working efficiency. Since the guide piece is bent after the shutter is mounted on the cartridge, moreover, the bending accuracy is subject to variation. In order to facilitate the bending work, furthermore, the shutter is formed of a relatively thin plate member, which has a low mechanical strength and is susceptible to deformation. In some cases, therefore, the shutter cannot be operated smoothly, due to defective engagement between the guide groove and the guide piece.

SUMMARY OF THE INVENTION

The present invention has been contrived in consideration of these circumstances, and it is an object of the invention to provide an information memory unit in which a shutter can be attached easily to a cartridge, thus ensuring improved assembling efficiency, and can be moved smoothly.

In order to achieve the above object, an information memory unit according to the present invention comprises an information memory medium; and a cartridge rotatably containing the information memory medium therein, the cartridge including a cartridge body containing the memory medium, the cartridge body having first and second surface walls facing each other at a predetermined distance and each having side edges, a first opening portion formed in the first surface wall so that part of the storage medium is exposed through the first opening portion, a second opening portion formed in the second surface wall and facing the first opening portion, and a guide groove formed on the first surface wall and extending along one of the side edges of the first surface wall; and a shutter slidably attached to the cartridge body, the shutter including a first shielding portion slidably located on the first surface wall, for opening and closing the first opening portion, a second shielding portion slidably located on the second surface wall, for opening and closing the second opening portion, a coupling portion connecting the first and second shielding portions, and a guide projection protruding from the first shielding portion and engaging the guide groove, thereby guiding the shutter in sliding action, the cartridge body having a fitting groove formed on the first surface wall and extending from the edge of the guide groove to the side edge of the first surface wall so as to decline toward the second surface wall, for guiding the guide projection to the guide groove when the shutter is attached to the cartridge body.

BRIEF DESCRIPTION OF THE DRAWINGS

FIGS. 1 to 12 show an information memory unit according to an embodiment of the present invention, in which:

FIG. 1 is a perspective view of the unit with its shutter on;

DETAILED DESCRIPTION OF THE PREFERRED EMBODIMENT

An embodiment of the present invention will now be described in detail with reference to the accompanying drawings.

Figure 1:
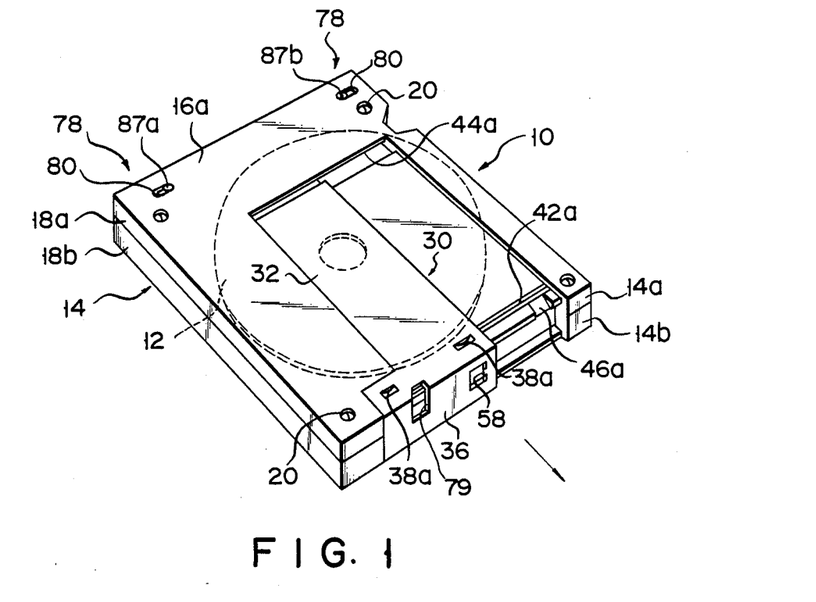
Figure 2:
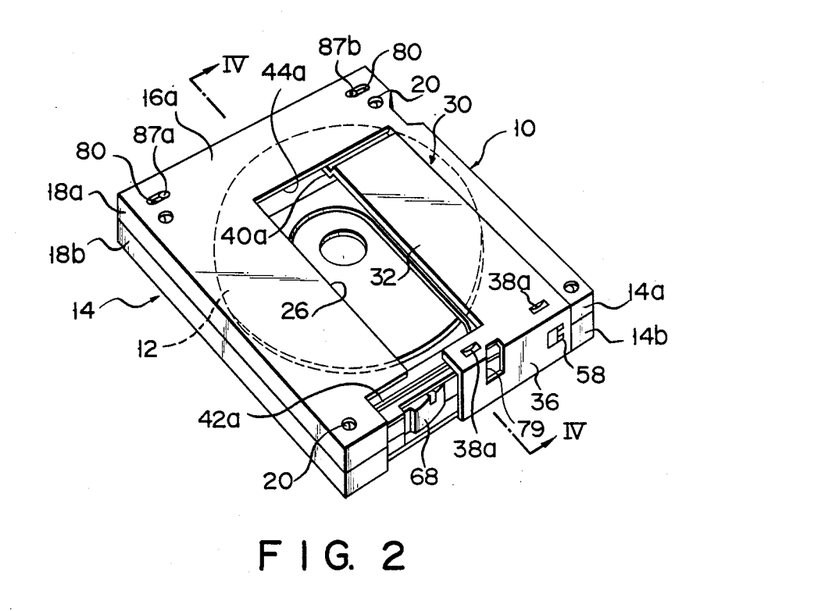
FIG. 2 is a perspective view of the unit with its shutter off.

As is shown in FIGS. 1 and 2, an information memory unit comprises cartridge 10 and optical disk 12 which is contained for rotation in the cartridge. For example, the optical disk used has an outside diameter of about 130 mm, inside diameter of about 15 mm, and thickness of about 1.2 to 3 mm. Disk 12 is formed, on each side thereof, with an information memory layer capable of optical storage and reproduction of information.

Figure 3:
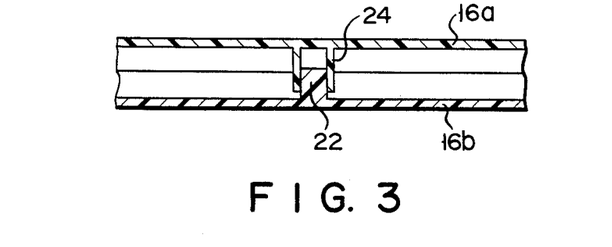
FIG. 3 is a longitudinal sectional view showing a coupled state.of a cartridge.

Cartridge 10 includes flat, box-shaped cartridge body 14, which is composed of a symmetrical pair of cartridge halves 14a and 14b. Halves 14a and 14b have their respective rectangular surface walls 16a and 16b, facing the surfaces of disk 12, and their respective four side walls 18a and 18b protruding from the side edges of the surface walls. The halves are coupled to each other by means of a plurality of screws 20 in a manner such that the respective end faces of side walls 18a and 18b abut against one another. As is shown in FIG. 3, a plurality of hollow cylindrical bosses 22 (only one shown) protrude from the inside of surface wall 16a. Corresponding to bosses 22, a plurality of solid cylindrical projections 24 protrude from the inside of surface wall 16b. Projections 24, which have a diameter substantially equal to the inside diameter of bosses 22, are fitted in their corresponding bosses. Thus, bosses 22 and projections 24 constitute a coupling portion as an aid for the connection between halves 14a and 14b.

As is shown in FIGS. 1 and 2, substantially rectangular opening 26 is formed in surface wall 16a of half 14a, extending beyond the peripheral edge of disk 12 from the central portion thereof. One side edge of opening 26 extends parallel to one side edge of wall 16a. Likewise, opening 28, which has the same shape as opening 26, is formed in surface wall 16b of half 14b so as to face opening 26. In information processing on optical disk 12, a read/write head (not shown) is brought close to the disk through openings 26 and 28, and a drive unit for rotating the disk is caused to engage the disk.

Figure 4:
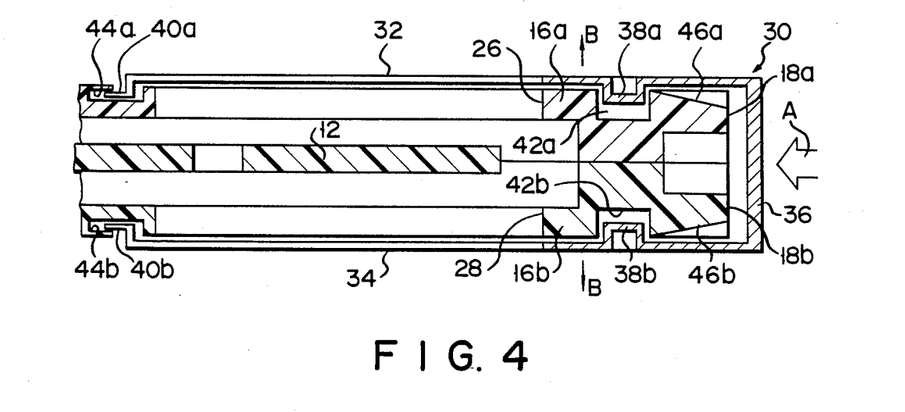
FIG. 4 is a sectional view taken along line IV—IV of FIG. 2.

Shutter 30 for opening and closing openings 26 and 28 is slidably mounted on cartridge body 14. As is shown in FIGS. 1, 2 and 4, shutter 30 is a substantially U-shaped metal plate, which includes substantially rectangular first and second shielding portions 32 and 34 and coupling portion 36 connecting the corresponding end edges of portions 32 and 34. First shielding portion 32, which is slidably located on surface wall 16a of half 14a, serves to open and close opening 26. Second shielding portion 34, which is slidably located on surface wall 16b of half 14b and extends parallel to portion 32, serves to open and close opening 28. Coupling portion 36 is situated opposite to underside walls 18a and 18b of body 14, as in FIGS. 1 and 2. The distance between shielding portions 32 and 34 is substantially equal to the thickness of cartridge body 14.

A pair of guide projections 38a are formed on that end portion of shielding portion 32 on the side of coupling portion 36, protruding therefrom toward shielding portion 34. The free end portion of shielding portion 32 is stepped, thus forming engaging portion 40a. Likewise, shielding portion 34 is formed with a pair of guide projections 38b and engaging portion 40b. A pair of parallel guide grooves 42a and 44a are formed on surface wall 16a of half 14a. Groove 42a is situated in the vicinity of the lower side edge of wall 16a, extending parallel thereto. Grooves 42a and 44a are spaced fully, and the central portion of optical disk 12 is located between them. Likewise, guide grooves 42b and 44b are formed on surface wall 16b of half 14b so as to face their corresponding guide grooves 42a and 44a of half 14a. Each guide projection 38a and engaging portion 40a of shielding portion 32 engage guide grooves 42a and 44a, respectively, of half 14a. Each guide projection 38b and engaging portion 40b of shielding portion 34 engage guide grooves 42a and 44b, respectively, of half 14b. Thus, shutter 30 can be slid along the guide grooves, between a closed position shown in FIG. 1, in which shielding portions 32 and 34 close openings 26 and 28 of cartridge body 14, and an open position shown in FIG. 2, in which the openings are opened so that part of optical disk 12 is exposed from body 14.

As is shown in FIGS. 1 and 4, a pair of fitting grooves 46a are formed on surface wall 16a of half 14a, corresponding to guide projections 38a of shutter 30. Each fitting groove 46a extends from the edge of guide groove 42a to the side edge of wall 16a so as to decline toward opposite half 14b and extends perpendicular to groove 42a. The distance between grooves 46a is equal to that between guide projections 38a. Likewise, a pair of fitting grooves 46b are formed on surface wall 16b of half 14b. Each fitting groove 46b extends from the edge of guide groove 42b to the side edge of wall 16b so as to decline toward opposite half 14a, and extends perpendicular to groove 42b. The distance between grooves 46b is equal to that between guide projections 38b.

In attaching shutter 30 to cartridge body 14, the shutter is pushed in, as indicated by arrow A in FIG. 4, so that it is positioned in a manner such that body 14 is situated between shielding portions 32 and 34, and that guide projections 38a and 38b face fitting grooves 46a and 46b, respectively. If shutter 30 is pushed in further after projections 38a and 38b abut against the bottoms of their corresponding fitting grooves 46a and 46b, projections 38a and 38b slide on the fitting grooves, thereby causing shielding portions 32 and 34 to be deformed elastically so that they move away from each other, as indicated by arrows B in FIG. 4. If shutter 30 is forced in further, guide projections 38a and 38b fall into guide grooves 42a and 42b, respectively, getting over their edges. At the same time, engaging portions 40a and 40b of shutter 30 are fitted into their corresponding guide grooves 44a and 44b of body 14, so that shielding portions 32 and 34 are restored to parallel relation. Thus, shutter 30 is slidably mounted on body 14.

Figure 5:
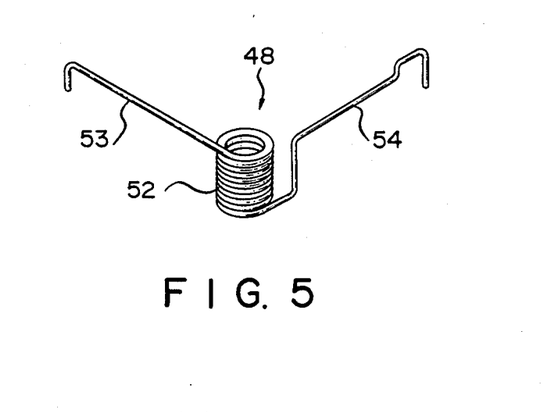
FIG. 5 is a perspective view of a closing spring.
Figure 6:
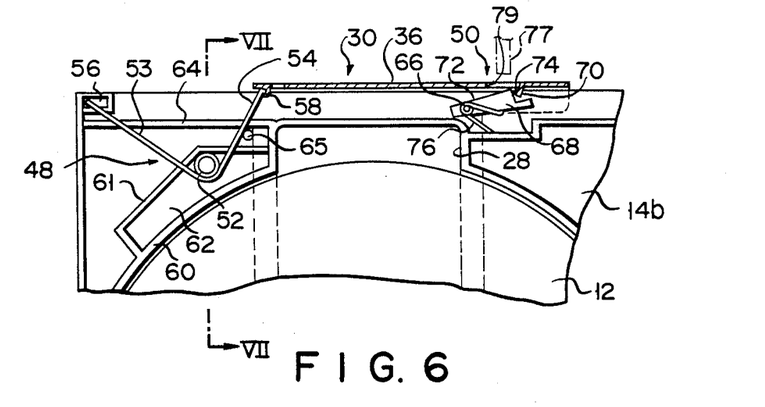
FIG. 6 is a plan view showing the closing spring and a shutter lock mechanism.
Figure 7:
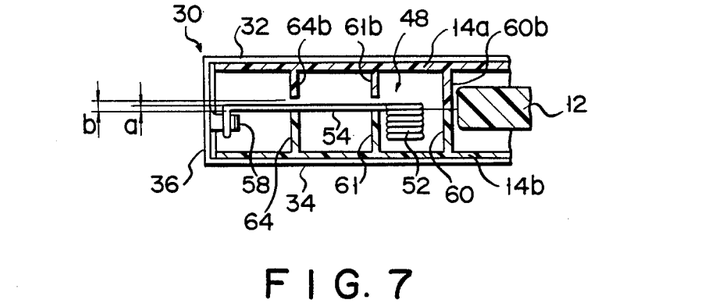
FIG. 7 is a sectional view taken along line VII—VII of FIG. 6.

Normally, shutter 30 is urged toward and locked to the closed position by closing spring 48 and lock mechanism 50, respectively. As is shown in FIGS. 5, 6 and 7, spring 48 is a torsion spring which has coiled portion 52 and a pair of arms 53 and 54 extending in opposite directions from the opposite ends of portion 52. The proximal end portion of arm 54 is bent so that arms 53 and 54 can be situated within the same plane. The distal end of each arm is bent at right angles. As is shown in FIGS. 6 and 7, the distal end of arm 53 is anchored to engaging recess 56 which is formed at the corner of half 14b. The distal end of arm 54 is hooked to spring anchor piece 58 which is formed on coupling portion 36 of shutter 30. Rib 60, extending along the outer periphery of optical disk 12, and arcuate rib 61, having two opposite ends continuous with rib 61, are formed on the inside of surface wall 16b of half 14b. Coiled portion 52 of spring 48 is located within space 62 which is surrounded by ribs 60 and 61. Thus, spring 48 is arranged in a V-shaped configuration, on the cartridge, thereby urging shutter 30 toward the closed position. Also, rib 64, which extends across arms 53 and 54 of spring 48, is formed on the inside of surface wall 16b of half 14b. Arms 53 and 54 rest on the respective top ends of ribs 61 and 64. Meanwhile, ribs 60b, 61b and 64b are formed on the inside of surface wall 16a of half 14a, so as to face ribs 60, 61 and 64, respectively. The height of ribs 61 and 64 is equivalent to the thickness of half 14b. The height of ribs 61b and 64b on the other hand, is shorter than the thickness of half 14a by length (b) which is a little greater than diameter (a) of the wire which constitutes spring 48. Thus, slits of width (b) are defined individually between ribs 61 and 61b and between ribs 64 and 64b. Arms 53 and 54 extend through these slits. In this arrangement, arms 53 and 54 are restrained from moving in a direction perpendicular to the surface walls of the cartridge halves, by ribs 61, 64, 61b and 64b. Also, coiled portion 52 of spring 48 is restrained from moving excessively by ribs 60 and 61. Thus, spring 48 is prevented from bursting, and its arms 53 and 54 cannot be disengaged from recess 56 or anchor piece 58 even if cartridge 10 is shocked or if shutter 30 is slid suddenly.

In FIG. 6, numeral 65 designates a stopper pin which protrudes from the inside of surface wall 16b of half 14b. Spring 48 is kept V-shaped as arm 54 of spring 48 abuts against pin 65, when shutter 30 is not attached to cartridge body 14, that is, when the distal end portion of arm 54 is not in engagement with anchor piece 58 of the shutter. Thus, shutter 30 can be attached easily to body 14.

As is shown in FIG. 6, lock mechanism 50 includes lock member 68 rockably mounted on support shaft 66, which protrudes from the inside of surface wall 16b of half 14b, and stopper piece 70 which is formed by raising part of coupling portion 36 of shutter 30 toward cartridge body 14. Lock member 68 has slanting surface 72, which faces coupling portion 36, and step portion 74 continuous with surface 72. Member 68 is urged around shaft 66, toward coupling portion 36, that is, toward the transfer path of piece 70, by torsion spring 76.

While shutter 30 is sliding from the open position to the closed position, stopper piece 70 engages slanting surface 72 of lock member 68. Thus, the stopper piece slides on surface 72, while rocking lock member 68 in a direction away from coupling portion 36 of shutter 30, resisting the urging force of spring 76. When shutter 30 reaches the closed position, stopper piece 70 is opposed to step portion 74 of lock member 68. Thereupon, lock member 68 rocks toward coupling portion 36, so that stopper piece 70 engages stopped portion 74. As a result, shutter 30 is restrained from moving toward the open position, and is locked to the closed position.

Lock mechanism 50 can be released by pressing lock member 68 by means of release lever 77 of an information processing apparatus through opening 79 formed in coupling portion 36 of shutter 30 so that stopper piece 70 is disengaged from step portion 74.

Figure 8:
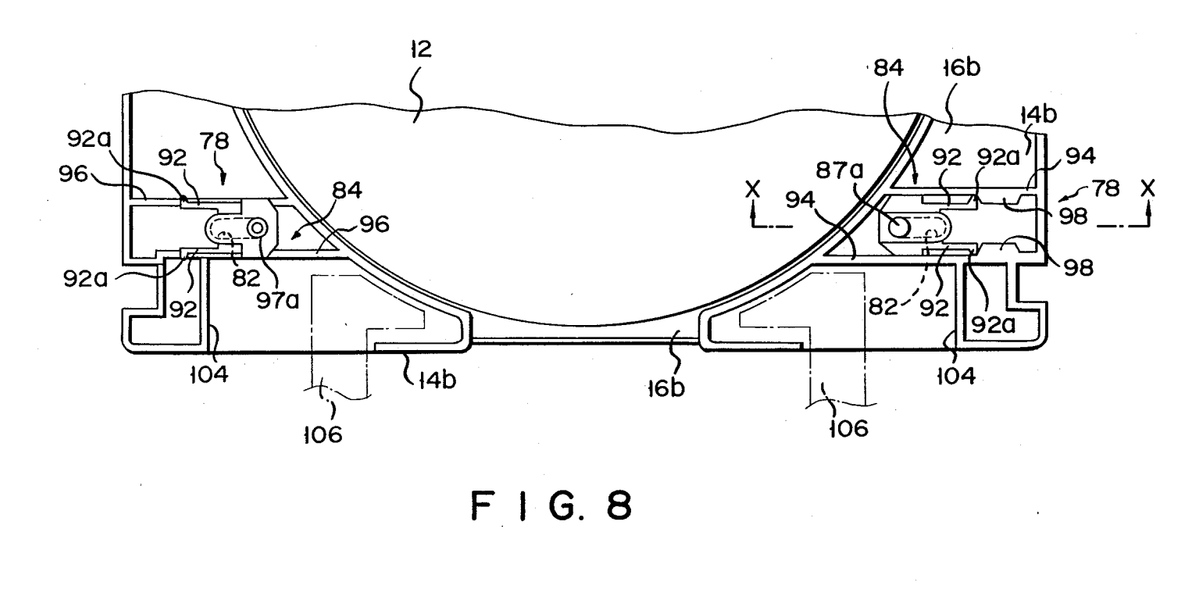
FIG. 8 is a plan view showing the rear end portion of the unit.
Figure 9:
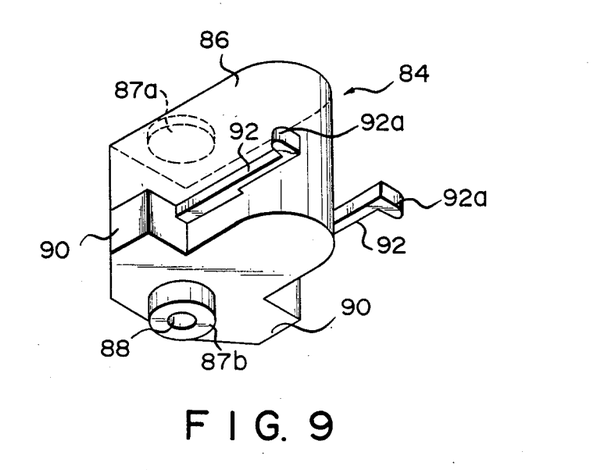
FIG. 9 is a perspective view of an erroneous-erasure prevention mechanism.
Figure 10:
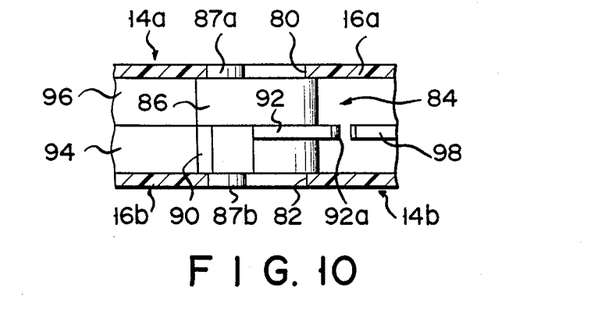
FIG. 10 is a sectional view taken along line X—X of FIG. 9.

As is shown in FIG. 1, a pair of erroneous-erasure prevention mechanisms 78 for sides A and B of the disk are provided individually at the two rear-side corners of cartridge 10. Mechanisms 78 prevent information in optical disk 12 from being erased by mistake. As is shown in FIGS. 8, 9 and 10, light-transmission windows 80 and 82, each in the form of a slot, are provided at each rear-side corner of halves 14a and 14b, respectively, so as to face each other. Each prevention mechanism 78 includes erasure prevention member 84 which, made of synthetic resin, is disposed inside cartridge body 14, and serves to open and close windows 80 and 82. Member 84 includes body 86 which has a cross section of substantially the same shape as that of each window, and a height substantially equal to the thickness of cartridge body 14. First and second projections 87a and 87b, in the form of coaxial cylinders, are formed on the top and bottom faces, respectively, of body 86. The diameter of these projections is equal to the width of the windows. Recess 88 is formed in the center of second projection 87b. Projecting part 90 protrudes from the lower portion of each side face of body 86. Elongate retaining arm 92 extends beyond the extreme end of body 86, from each projecting part 90. Arms 92 extend parallel to each other and in the longitudinal direction of body 86. Retaining projection 92a is formed on the extended end of each arm 92. The two retaining projections project away from each other.

Figure 11:
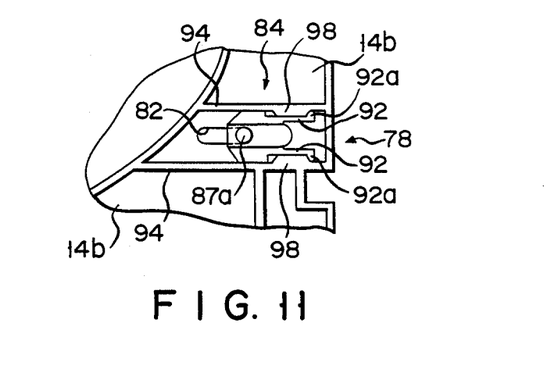
FIG. 11 is a plan view showing the rear end portion of the unit.

Two pairs of guide ribs 94 and 96 are formed on the inside of surface wall 16b of half 14b. Ribs 94 are situated individually on two opposite sides of one of transmission windows 82, and extend parallel to each other and along the longitudinal axis of window 82. The distance between guide ribs 94 is equal to that between the respective extreme ends of projecting parts 90 of prevention member 84. Trapezoidal regulating step portion 98 is formed on each of the opposite surfaces of ribs 94. One of prevention members 84 is located between ribs 94 in a manner such that second projection 87b is fitted in window 82. Member 84 is slidable along ribs 94 between a closed position of FIG. 8, in which window 82 is closed by body 86, and an open position of FIG. 11, in which part of window 82 is open.

Guide ribs 96 are situated individually on two opposite sides of the other of transmission windows 82, and extends parallel to each other and along the longitudinal axis of window 82. The distance between ribs 96 is substantially equal to the width of body 86 of prevention member 84. The other of prevention members 84 is located between ribs 96 so as to be slidable along the same, in a manner such that first projection 87a is fitted in window 82.

Meanwhile, another two pairs of guide ribs 94 and 96 are formed on the inside of surface wall 16a of half 14a, so as to be symmetrical with the guide ribs of half 14b. Thus, when halves 14a and 14b are joined together, ribs 94 and 96 of half 14b face ribs 96 and 94 of half 14a, respectively. With this arrangement, each prevention member 84 is slidably held in cartridge body 14, in a manner such that the projecting-part-side half of member 84 is situated between ribs 94, and that the remaining half of member 84 is situated between ribs 96.

Normally, each prevention member 84 is held in the closed position, as retaining projection 92a of each arm 92 engages one end of step portion 98 of its corresponding guide rib 94 so that member 84 is restrained from sliding. If member 84 is pressed toward the open position, arms 92 are deformed elastically so as to approach each other, so that projections 92a slide individually on step portions 98 of ribs 94. When projections 92a reach the respective other ends of step portions 98, arms 92 are restored to their original state. Thereupon, projections 92a engage the other ends of their corresponding step portions 98, so that prevention member 84 is held in the open position. The shifting of member 84 between the closed and open positions can be effected by sliding it by means of a rod-shaped operating member inserted in recess 88 of first projection 87a. In other words, the prevention members cannot be shifted unexpectedly from the outside of cartridge 10.

In the closed position, light-transmission windows 80 and 82 are closed by prevention members 84, so that a detection light beam emitted from the information processing apparatus cannot be transmitted through the windows. In this case, the processing apparatus concludes that information can be stored in optical disk 12. In the open position, on the other hand, the detection light beam from the processing apparatus is transmitted through windows 80 and 82, and detected by a sensor. Thereupon, the processing apparatus concludes that information cannot be stored in disk 12.

Figure 12:
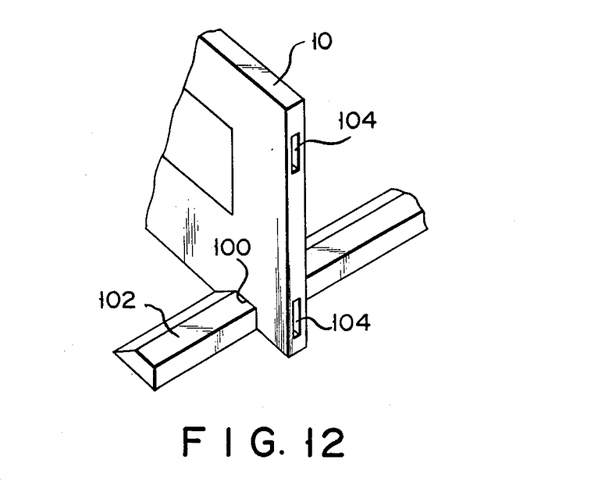
FIG. 12 is a perspective view showing the rear end portion of the unit.

In FIG. 12, numeral 100 designates a recess which is formed in the side wall of cartridge body 14. Recess 100 is used to detect sides A and B of cartridge 10, i.e., those of the optical disk. As is shown in FIG. 12, it engages positioning bar 102, which is attached to a holder portion of an auto-changer for automatically loading the information processing apparatus with the memory unit. Thus, recess 100 serves also for positioning in the holder portion.

As is shown in FIGS. 8 and 12, a pair of substantially L-shaped recesses 104 are formed in the rear side wall of cartridge body 14. Holding hooks 106 of the auto-changer, used to transport the memory unit, are inserted individually into recesses 104.

In the information memory unit constructed in this manner, the cartridge body has the fitting grooves which extend from each guide groove to the side edge of the body. In this arrangement, the guide projections of the shutter can be guided to the guide grooves with use of the fitting grooves as guide means. Therefore, the guide projections can be formed on the shutter before the shutter is fitted to the cartridge body. Thus, the memory unit is improved in manufacturing and assembling efficiencies. Also, the guide projections can be worked accurately by means of a suitable machine. The shutter can be formed from a thicker plate than in the case of the prior art memory unit, so that it has an improved mechanical strength, and cannot be deformed. Thus, the engagement between the guide projections of the shutter and the guide grooves of the cartridge body can be improved, thereby ensuring smooth operation of the shutter.

It is to be understood that the present invention is not limited to the embodiment described above, and that various changes and modifications may be effected therein by one skilled in the art without departing from the scope or spirit of the invention.

In the above described embodiment, for example, the guide grooves are formed individually in the two surface walls of the cartridge body. Alternatively, however, the guide projections may be formed only on one of the surface walls of the shutter. In this case, the number of guide projections can be changed as required. Although each fitting groove is just wide enough to guide one guide projection according to the aforementioned embodiment, two fitting grooves may be formed continuously so that two guide projections can be guided together.

What is claimed is:

1. An information memory unit comprising:
an information memory medium; and
a cartridge rotatably containing the information memory medium therein,
said cartridge including a cartridge body containing the memory medium, the cartridge body having first and second surface walls facing each other at a predetermined distance and each having side edges, a first opening portion formed in the first surface wall so that part of the memory medium is exposed through the first opening portion, a second opening portion formed in the second surface wall and facing the first opening portion, and a guide groove formed on the first surface wall and extending along one of the side edges of the first surface wall; and
a shutter slidably attached to the cartridge body, said shutter including a first shielding portion slidably located on the first surface wall, for opening and closing the first opening portion, a second shielding portion slidably located on the second surface wall, for opening and closing the second opening portion, a coupling portion connecting the first and second shielding portions, and a guide projection protruding from the first shielding portion and engaging the guide groove, thereby guiding the shutter in sliding action,
said cartridge body having a fitting groove formed on the first surface wall and extending from the edge of the guide groove to the side edge of the first surface wall so as to decline toward the second surface wall, for guiding the guide projection to the guide groove when the shutter is attached to the cartridge body.

2. A unit according to claim 1, wherein said cartridge body has a second guide groove formed on the second surface wall and extending parallel to the first guide groove; said shutter has a second guide projection formed on the second shielding portion and engaging the second guide groove; and said cartridge body has a second fitting groove formed on the second surface wall and extending from the edge of the second guide groove to the side edge of the second surface so as to decline toward the first surface wall, for guiding the second guide projection to the second guide groove when the shutter is attached to the cartridge body.

3. A unit according to claim 1, wherein said first and second shielding portions of the shutter each include a free end portion spaced from the coupling portion and having an engaging portion, and said first and second surface walls individually include guide portions engaging the engaging portions of the first and second shielding portions, respectively, thereby guiding the shielding portions in movement.

4. A unit according to claim 1, wherein said cartridge includes urging means for urging the shutter toward a closed position where the first and second opening portions are closed by the first and second shielding portions, respectively, and a lock mechanism for locking the shutter in the closed position.

5. A unit according to claim 4, wherein said urging means includes a torsion spring having a coiled portion and first and second arms extending therefrom, said first and second arms engaging the cartridge body and the shutter, respectively.

6. A unit according to claim 5, wherein said first and second arms are situated flush with each other and within a plane substantially parallel to the first and second surface walls of the cartridge body, and said cartridge body includes restriction means for restraining the first and second arms from moving in a direction perpendicular to the surface walls of the cartridge body.

7. A unit according to claim 6, wherein said restriction means includes at least two first ribs protruding from the inside of the first surface wall, and at least two second ribs formed on the inside of the second surface wall so as to face the first ribs, said first and second arms being held between the first and second ribs.

8. A unit according to claim 4, wherein said lock mechanism includes a stopper portion protruding from the coupling portion of the shutter toward the cartridge body, a lock member attached to the cartridge body so as to be movable between a locking position, where the lock member is situated on a path of transfer of the stopper portion, and a lock release position off the transfer path, and an urging member for urging the lock member toward the locking position, said lock member having an engaging portion adapted to engage the retaining portion, thereby preventing the shutter from moving, when the shutter is situated in the closed position.

9. A unit according to claim 8, wherein said coupling portion includes a lock release hole through which the lock member is pressed toward the lock release position, said unlocking hole being located so as to face the lock member when the shutter is situated in the closed position.

10. A unit according to claim 1, wherein said information memory medium has sides A and B, and said cartridge body has a recess for positioning the cartridge and detecting sides A and B of the memory medium.

11. A unit according to claim 1, wherein said cartridge body includes a holding portion used to hold and transport the cartridge.

12. An information memory unit comprising:
an information memory medium; and
a cartridge rotatably containing the memory medium therein;
said cartridge including an opening portion through which part of the memory medium is exposed,
a shutter slidably mounted on the cartridge, for opening and closing the opening portion, and
a torsion spring for urging the shutter toward a closed position where the opening portion is closed by the shutter, said torsion spring having a coiled portion, and first and second arms which extend from the coiled portion and engage the cartridge and shutter, respectively, said first and second arms being situated flush with each other and within a common plane substantially parallel to a sliding direction of the shutter.

13. A unit according to claim 12, wherein said cartridge includes first and second surface walls facing each other at a predetermined distance, said memory medium and torsion spring being located between the first and second surface walls, and means for restraining the first and second arms from moving in a direction intercepting said common plane, the restraining means including at least two first ribs protruding from the inside of the first surface wall, and at least two second ribs formed on the inside of the second surface wall so as to face the first ribs, respectively, said first and second arms being held between the first and second ribs to be movable along them.

14. A unit according to claim 12, wherein said lock mechanism includes a stopper portion protruding from the shutter toward the cartridge body, a lock member attached to the cartridge body so as to be movable between a locking position, where the lock member is situated on a path of transfer of the stopper portion, and a lock release position off the transfer path, and an urging member for urging the lock member toward the locking position, said lock member having an engaging portion adapted to engage the retaining portion, thereby preventing the shutter from moving, when the shutter is situated in the closed position.

15. An information memory unit comprising:
an information memory medium;
a cartridge rotatably containing the information memory medium therein, said cartridge including a cartridge body containing the memory medium, the cartridge body having first and second surface walls facing each other at a predetermined distance and each having side edges, and a guide groove formed on the first surface wall and extending along one of the side edges of the first surface wall; and
a shutter slidably attached to the cartridge body, said shutter including a first shielding portion slidably located on the first surface wall, a second shielding portion slidably located on the second surface wall, and a guide projection protruding from the first shielding portion and engaging the guide groove, thereby guiding the shutter in sliding action;
said cartridge body having a fitting groove formed on the first surface wall and extending from the edge of the guide groove to the side edge of the first surface wall so as to decline toward the second surface wall, for guiding the guide projection to the guide groove when the shutter is attached to the cartridge body.

16. A unit according to claim 15, further comprising an erroneous-erasure prevention means for preventing erroneous erasure of the memory medium, said prevention means including a first view window disposed in the first surface wall, a second view window disposed in the second surface wall to face said first view window, and an erroneous erasure prevention member arranged in the cartridge body to be slidable between a closed position, wherein the prevention member covers the first and second view windows, and an open position wherein the first and second view windows are uncovered.

17. A unit according to claim 16, wherein said erroneous-erasure prevention mechanism includes a pair of first guide ribs protruding from the inside of the first surface wall and situated on either side of the first view window, so as to extend parallel to each other, and a pair of second guide ribs protruding from the inside of the second surface wall and situated on either side of the second view window, so as to extend parallel to each other; and said prevention member has a cross section larger than the first and second view windows, and includes a body having a first portion situated between the first ribs and a second portion situated between the second guide ribs, said prevention member body being movable along the guide ribs.

18. A unit according to claim 17, wherein said first guide ribs have their respective projecting parts projecting toward their opposite first guide ribs, each projecting part having first and second step portions spaced in the moving direction of the prevention member; and said prevention member includes a pair of retaining arms protruding from the first portion so as to extend parallel to each other along the first guide ribs, and capable of elastic deformation toward each other, and retaining portions formed individually on the extended ends of the arms and engaging their corresponding first guide ribs, for engaging the first step portion of each corresponding projecting part so as to hold the prevention member in the closed position, when the prevention member is moved to the closed position, and for engaging the second step portion of the projecting part so as to hold the prevention member in the open position, when the prevention member is moved to the open position.

19. A unit according to claim 18, wherein said erroneous-erasure prevention member includes first and second projections protruding from the prevention member body into the first and second view windows, respectively, the first projection having a control recess opening toward the outside of the cartridge body and adapted for use in moving the erroneous-error prevention member from the outside of the cartridge body.

* * * * *